United States Patent
Hirabayashi et al.

(10) Patent No.: US 6,660,165 B1
(45) Date of Patent: Dec. 9, 2003

(54) METHOD FOR REGENERATING INORGANIC POROUS PARTICLES, METHOD FOR PURIFYING WATER, AND CONTINUOUS WATER PURIFICATION DEVICE

(75) Inventors: Yasuhiko Hirabayashi, 13-3, Nagayama 6-chome, Ryugasaki City, Ibaraki (JP); Nobukazu Onishi, Tokyo (JP)

(73) Assignees: Japan, represented by Director General of Forestry and Forest Products Research Institute Forestry Agency, Ministry of Argriculture Forestry and Fisheries, Kukizaki-machi (JP); The National Space Development Agency of Japan, Tsukuba (JP); The Japan Space Forum, Tokyo (JP); Yasuhiko Hirabayashi, Ryugasaki (JP)

(*) Notice: Subject to any disclaimer, the term of this patent is extended or adjusted under 35 U.S.C. 154(b) by 0 days.

(21) Appl. No.: 09/702,978

(22) Filed: Oct. 30, 2000

(30) Foreign Application Priority Data

Mar. 28, 2000 (JP) .......................................... 2000-088087

(51) Int. Cl.$^7$ .................................................. C02F 1/44
(52) U.S. Cl. ............. 210/640; 210/500.37; 210/500.29; 210/663; 210/262; 95/52; 95/90; 95/116; 95/128; 95/148
(58) Field of Search ............................ 210/640, 500.37, 210/663, 262, 500.29; 95/52, 90, 128, 148, 116

(56) References Cited

U.S. PATENT DOCUMENTS 4,875,908 A * 10/1989 Kikukawa et al.
4,909,810 A * 3/1990 Nakao et al.
4,944,881 A * 7/1990 Michizuki et al.
4,963,165 A * 10/1990 Blume et al.
4,985,147 A * 1/1991 Mochizuki et al.
5,051,188 A * 9/1991 Spiske et al.
5,211,728 A * 5/1993 Trimmer
5,226,932 A * 7/1993 Prassad
5,234,884 A * 8/1993 Mouri et al.
5,439,659 A * 8/1995 Izumo
5,463,121 A * 10/1995 Sridhar
5,626,650 A * 5/1997 Rodriguez et al.
5,723,639 A * 3/1998 Datta et al.
5,753,008 A * 5/1998 Friesen et al.
5,968,232 A * 10/1999 Whitlock
6,179,900 B1 * 1/2001 Behing et al.
6,306,198 B1 * 10/2001 Corbin

* cited by examiner

Primary Examiner—Ana Fortuna
(74) Attorney, Agent, or Firm—Curtis L. Harrington

(57) ABSTRACT

The present invention is to provide a method for regenerating inorganic porous particles, a method for purifying water and a continuous water purification device, which can be easily applied as a recycling system of water in special environments such as space environment, by safely removing impurities contained in water and water vapor with a usage of a compact facility without using any chemicals. The method for regenerating inorganic porous particles is characterized in that adsorbed products such as ammonia and/or amines, are reduced by heating to 100–200° C. under a reduced pressure of 10 Pa or less. The method for purifying water and the continuous water purification device are characterized in that a dense membrane having cationic groups and/or a composite membrane in which a hydrophilic membrane is layered on a surface of a hydrophobic porous membrane is used as a permeable membrane are used as a permeable membrane.

6 Claims, 1 Drawing Sheet

METHOD FOR REGENERATING INORGANIC POROUS PARTICLES, METHOD FOR PURIFYING WATER, AND CONTINUOUS WATER PURIFICATION DEVICE

BACKGROUND OF THE INVENTION

1. Field of the Invention

The present invention relates to a method for regenerating inorganic porous particles, a method for purifying water, and a continuous water purification device. The object thereof is to provide a method for regenerating inorganic porous particles, a method for purifying water, and a continuous water purification device, each of which can be applied as a water-recycling system even in special environment such as space environment by using compact equipment with no chemicals and safely removing ammonia and amines contained in water and water vapor.

Additionally, in the present specification, smaller pressure values means higher vacuum pressures, and larger pressure values means lower vacuum pressures.

2. Description of the Related Art

In recent years, manned space flights have been frequently carried out, using a spaceship such as a space shuttle, and also, construction of an international space station is planned.

In a case of astronauts staying in the space for a long period, the most serious problem is to ensure water. At the present, water necessary for astronauts' lives is supplied with water as a byproduct of fuel cells and water replenished by launching from the earth. However, the supplement of water from fuel cells is restricted in terms of its amount, and it is difficult to replenish a large amount of water from the earth because the replenishment of water by launching from the earth costs about 2.5 million yen per kg of water. For such reason, as space staying time is prolonged and the number of flight crew members is increased, ensuring water in space environment has become a serious problem.

At present, researches have been conducted in recycling by purifying water or urine which are discharged from space facilities to the space. As for such present recycling system, an apparatus using a reverse osmotic membrane method and membrane distillation method have been examined. However, with the reverse osmotic membrane method which has a low efficiency in removing impurities, there is a defect that an apparatus used for this method has to be enlarged because this method requires multi-processed treatment. Moreover, a risk of explosion is incurred because this method requires a high pressure. Thus, this method cannot be easily applied to special environment such as space facilities of which size is restricted and space environment.

Membrane distillation method using a porous hydrophobic membrane is quite different to pervaporation membrane method. The membrane distillation is a separation method based on vapor pressure difference, which is driving force for permeation of respective components. The vapor pressure difference, which is the driving force, is caused by the difference in temperatures at both sides of the membrane. Since the membrane used in the membrane distillation method has pores, if the pressure in the permeation side thereof is reduced as in the pervaporation membrane method, components are not separated to permeate through the membrane. Weak points of the membrane distillation are as follows. First, the surface of a porous hydrophobic membrane turns hydrophilic by running for a long time so that liquid in its original condition becomes to permeate through the membrane. Also, on the basis of the module structure of the membrane, since high temperature and low temperature sections become close to each other at both sides of the membrane, the module structure becomes complicated and thus, it becomes difficult to make the structure light in weight. Further, permeation flow rate is small. For these reasons, this method cannot be easily applied in space facilities which size is restricted or in space environment.

The present inventors have researched a method for recycling waste water, urine or the like, which can be used in a restricted space in space facilities, by use of a simple device with no chemicals.

First, the present inventors have examined a method of using inorganic porous particles such as silica gel particles as a method for separating impurities which has been hitherto used. This method is a method having high separating ability. However, this method has a problem that for long-term use thereof regeneration-treatment is essential because long term use of this method causes a decrease in adsorptivity. As for regeneration of the inorganic porous particles, it is general to use a solvent, however, in space environment, no regenerating method using a chemical can be applied because the use of the chemical (the solvent) causes a discharge of new waste. Also, as a result of the present inventors' eager investigations, they have decided to research on regenerating inorganic porous particles without using chemicals.

As a membrane separation method, there is a pervaporation method which is different from the reverse osmotic membrane method and the like without no conditions incurring a risk, such as a pressurization condition, as a separation method of membranes which can make an apparatus therefor small in size. This method together with the above-mentioned problems has been studied at the same time. This pervaporation method is a separation method involving phase-changes wherein feeding side (primary side) thereof is liquid and the permeation side (secondary side) thereof is gas. Any conventional membrane method has a problem that substances, which are slightly different in their molecular weights or boiling points and have similar characteristics, for example, water and ammonia or amines, cannot be separated. Therefore, it is necessary to solve the problems that similar substances, such as water and ammonia or the like, are separated and simultaneously make good use of an advantage of the pervaporation method of which apparatus is small in size.

SUMMARY OF THE INVENTION

The present invention has been invented for solving many problems such as the above-mentioned, and the invention is a method for regenerating inorganic porous particles adsorbing at least ammonia and/or amines, and it relates to the method for regenerating inorganic porous particles, which is characterized in that the inorganic porous particles are heated to 100–200° C. under a reduced pressure of 10 Pa or less to remove adsorbed products such as ammonia and/or amines.

The invention is a method for purifying water containing at least ammonia and/or amines as impurities by pervaporation method and it relates to the method for purifying water which is characterized in that a dense membrane having cationic groups is used as a permeable membrane so as to suppress permeation of the impurities such as ammonia and/or amines and further cause water to permeate preferentially through the membrane.

The invention is a method for purifying water containing at least ammonia and/or amines as impurities by pervaporation method, and it relates to the method for purifying water, which is characterized in that a composite membrane wherein a hydrophilic membrane is layered on a surface of a hydrophobic porous membrane is used as a permeable membrane so as to suppress permeation of water and further cause the impurities such as ammonia and/or amines to permeate preferentially through the membrane.

The invention is a method for purifying water containing at least ammonia and/or amines as impurities by pervaporation method, and it relates to a method for purifying water, which is characterized in that a dense membrane having cationic groups is used as a permeable membrane so as to suppress permeation of the impurities such as ammonia and/or the amines, and further the impurities that have permeated through said permeable membrane are adsorbed and removed by use of inorganic porous particles.

The invention is a method for purifying water containing at least ammonia and/or amines as impurities by pervaporation method, and it relates to the method for purifying water, which is characterized in that a composite membrane layered on a surface of a hydrophobic porous membrane is used as a permeable membrane so as to cause the impurities such as ammonia and/or amines to permeate preferentially through the membrane, and further the impurities that have not permeated through said permeable membrane are adsorbed and removed by use of inorganic porous particles.

The invention is a method for purifying water containing at least ammonia and/or amines as impurities by pervaporation method, and it relates to the method for purifying water, which is characterized in that a composite membrane wherein a hydrophilic membrane is layered on a surface of a hydrophobic porous membrane is used as a permeable membrane so as to cause the impurities such as ammonia and/or amines to permeate preferentially through the composite membrane; fraction that has not permeated through said composite membrane is further subjected to the pervaporation using a dense membrane having cationic groups so as to suppress permeation of the impurities such as ammonia and/or amines and cause water to permeate preferentially through the dense membrane; and the impurities that have permeated through the dense membrane having said cationic groups are adsorbed and removed by use of inorganic porous particles.

The invention is a method for purifying water, and it relates to the method for purifying water, which is characterized in that the inorganic porous particles adsorbing the impurities such as ammonia and/or amines are heated to 100–200° C. under a reduced pressure of 10 Pa or less, to remove the adsorbed products such as ammonia and/or amines.

The invention is a continuous water purification apparatus containing at least ammonia and/or amines as impurities, which comprises a pervaporation apparatus and two or more impurity-adsorbing apparatuses wherein a permeable membrane of said pervaporation apparatus comprises a dense membrane having cationic groups, a regenerating apparatus comprising a heating means and a pressure-reducing means is disposed in each of the impurity-adsorbing apparatuses, and it relates to the continuous water purification apparatus, which is characterized in that a permeation side of the pervaporation apparatus is connected to the impurity-adsorbing apparatuses through vapor-sending tubes to which directional controlling valves are fitted, respectively.

The invention is a continuous water purification apparatus containing at least ammonia and/or amines as impurities, which comprises first and second pervaporation apparatuses and two or more impurity-adsorbing apparatus, and it relates to the continuous water purification apparatus which is characterized in that a permeable membrane of said first pervaporation apparatus is comprised of a composite membrane in which a hydrophilic membrane is layered on a surface of a hydrophobic porous membrane, a permeable membrane of said second pervaporation apparatus is comprised of a dense membrane having cationic groups, a supplying side of said first pervaporation apparatus is connected to a supplying side of said second pervaporation apparatus so that fraction that has not permeated through the permeable membrane of the first pervaporation apparatus is supplied to the supplying side of the second pervaporation apparatus, a regenerating apparatus comprising a heating means and a pressure-reducing means is disposed in each of said impurity-adsorbing apparatuses, and a permeation side of said second pervaporation apparatus is connected to the impurity-adsorbing apparatuses through vapor-sending tubes to which directional controlling valves are fitted, respectively.

PREFERRED EMBODIMENTS OF THE INVENTION

Figure 1:
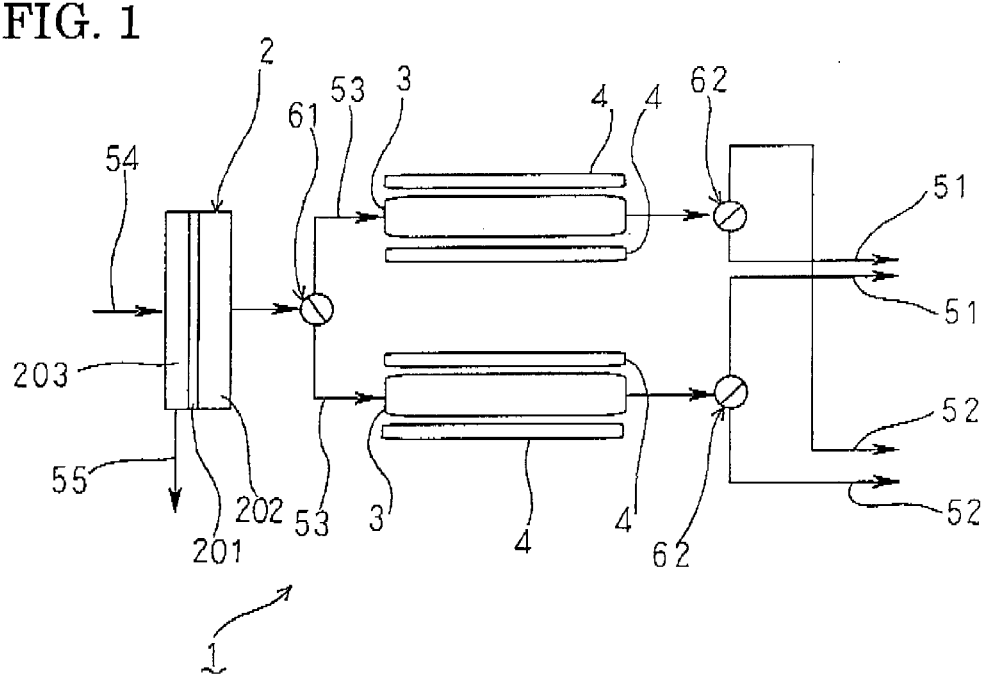
FIG. 1 is a schematic view illustrating a continuous water purification device related to the first embodiment of the present invention.

The following description firstly describes a method for regenerating inorganic porous particles, which relates to the present invention.

The method for regenerating inorganic porous particles, which relates to the present invention, is a method for regenerating inorganic porous particles by removing adsorbed products from the inorganic porous particles of which adsorptivity is lowered by being used for adsorption-removing of impurities such as ammonia and amines with a usage of a physical method. Concretely speaking, it is carried out by heating the inorganic porous particles that are to be regenerated with a reduced pressure.

A means for reducing pressure is not particularly restricted, and as for a usage on the earth, it is exemplified in a vacuum pump and the like. As for a usage on a spaceship and the like, reduced pressure can easily be gained by utilizing space environment of super high vacuum.

Also, a means for heating is not particularly restricted, and it is exemplified in electric heating, infrared heating and such.

A condition of reduced pressure is set to be a pressure under numerical value of 10 Pa. The reason for this is that adsorbed products cannot be adsorbed at a pressure higher than 10 Pa. However, being different to the space environment at where super high vacuum of 10 Pa can be easily gained, a bigger equipment is necessary for reducing pressure lower than 0.1 Pa on the earth, thus, it is not preferable in terms of cost. Also, a heating condition is set to be 100–200° C. The reason for this is that the adsorbed products cannot be adsorbed at a temperature lower than 100° C., and even it is heated to a temperature higher than 200° C., no better effects can be gained, and further, a bigger equipment is considered necessary therefor, thus, neither of the case is preferable.

Under the above-mentioned conditions, desorption of the adsorbed products such as ammonia and amines that have adsorbed to inorganic porous particles can be almost completely done by generally treating for 3–10 hours.

This method for regenerating only uses physical means such as reduced pressure/high vacuum and heating, without using chemical means such as a method using solvent which has been hitherto carried out as a regenerating method of inorganic porous particles. This is why after-treatment such as solvent used for a regenerating process is not necessary, and thus, it can preferably be used as a method for regenerating inorganic porous particles in a limited environment such as the space environment.

Furthermore, this regenerating method can be suitably used for regenerating a various kinds of inorganic porous particles such as active carbon, charcoal, zeolite, vermiculite, silica gel, activated alumina, titanium oxide, bentonite, acid clay, diatomaceous earth, magnesium oxide and calcium carbonate.

The next description describes a method for purifying water by a pervaporation method related to the present invention. The method for purifying water described in the below is suitable for purifying water wherein ammonia, amines and the like as impurities are dissolved.

Firstly, the first method of water purification will be described. The first method of water purification by a pervaporation method is a method wherein permeation of the impurities such as ammonia and amines are suppressed by electric repulsion of the impurities such as ammonia and amines and the permeable membrane water is preferentially permeated to lower concentration of the impurities such as ammonia and amines on a permeation side (secondary side) than that on a feeding side (primary side).

As for the permeable membrane used for this method for water purification, a dense membrane having cationic groups is used. The reason thereof is that the permeation of the impurities such as ammonia and amines can be suppressed due to the electric repulsion occurred between the cationic groups of the permeable membrane and ammonia and amines.

As for the dense membrane having cationic groups, it is exemplified in a membrane comprised of chitosan and derivatives thereof, polyamine membrane, primary to quaternary alkyl ammonium polymer and such, and in particular, chitosan membrane with a high degree of deacetylation is most preferably used.

With the pervaporation method using the dense membrane having cationic groups as a permeable membrane, the permeation of impurities such as ammonia and amines can be suppressed and at the same time, water can be preferentially permeated. Although pressure difference between the pressure on the feeding side and the pressure on the permeation side is not particularly restricted, it is preferable to set the pressure on the feeding side either as the atmospheric pressure and pressure around thereof or the atmospheric pressure within a spaceship, and to keep the pressure on the permeation side lower than vapor pressure of components permeated through the permeable membrane.

As for a method for keeping the pressure on the permeation side lower than the vapor pressure, it is exemplified in methods such as a method wherein pressure is reduced by using a vacuum pump and the like and a method wherein gaseous substances which do not react to permeable components is supplied to the permeation side, however, the method wherein pressure is reduced by using a vacuum pump and the like is preferable. Additionally, within a space environment such as spaceship, a pressure-reducing apparatus such as a vacuum pump is not necessary, so that the above mentioned method can be easily applied.

Furthermore, the temperature at the time of separation is not particularly restricted, however, it is better to set it in a range of 20–90.

The next section describes the second method for purifying water by a pervaporation method.

The second method of water purification is a method for reducing the concentration of the impurities such as ammonia and amines on the feeding side, wherein the impurities such as ammonia and amines which have lower polarity than that of water and high hydrophobic property are preferentially permeated by pervaporation using a composite membrane in which a hydrophilic membrane is layered on a surface of a hydrophobic porous membrane.

As for the hydrophobic porous membrane used for this method, it can be exemplified in polypropylene membrane, polyethylene membrane, silicone membrane, Teflon membrane and such, however, it is not particularly restricted.

The hydrophilic membrane layered on a surface of said hydrophobic porous membrane is exemplified in deacetylated cellulose acetate membrane, regenerated cellulose membrane, polyalchol membrane, polysulfone membrane and such, and in particular, it is preferable to use deacetylated cellulose acetate membrane or regenerated cellulose membrane.

A method for layering the hydrophilic membrane on the surface of said hydrophobic porous membrane is not particularly restricted. For example, with a method for forming the regenerated cellulose membrane on the surface of the hydrophobic porous membrane, desired composite membrane can be gained by coating acetone solution of cellulose acetate on the surface of the hydrophilic membrane and drying before deacetylating with sodium hydrate solution.

In the same condition as the above described first method of water purification, the concentration of the impurities such as ammonia and amines can be lowered by the pervaporation method using above mentioned composite membrane. In other words, since the impurities such as ammonia and amines dissolved in water have lower polarity and a little higher hydrophobic property than that of water, they preferentially permeate through the composite membrane. This is why the concentration of impurities such as ammonia and amines on the permeation side becomes higher than that of on the feeding side, and thus, the concentration of the impurities such as ammonia and amines on the feeding side can be lowered.

With the former pervaporation method, it has been considered that substances such as water and ammonia or amines, which have close molecular weight and similar characteristics to each other, cannot be separated. However, with the above-described first and second methods of water purification, water and ammonia and amines can be separated. Since those two methods are considered as a pervaporation method, any condition, which may be dangerous, such as an application of pressure, is not required. Furthermore, a condition of reduced pressure required for a pervaporation method can be quite easily gained in the space environment. Therefore, this is a method that can be suitably used in a situation such as the space environment.

Next section describes a method for purifying water which can almost completely remove the impurities such as ammonia and amines in water and water vapor by carrying out the above-described first and second methods of water purification using the pervaporation method and an adsorption removing method which uses inorganic porous particles for several times at the same occasion.

The first section describes the third method of water purification. This third method of water purification is comprised of a pervaporation method using a dense membrane having cationic groups as a permeable membrane and the adsorption removing method using inorganic porous particles.

This method is a method of adsorption treatment of fraction using inorganic porous particles, wherein the fraction permeated through the permeable membrane after water containing the ammonia and amines as impurities is treated by the pervaporation method using the dense membrane having the cationic groups.

The pervaporation method using the dense membrane having the cationic groups is the same method as the method described in said first method of water purification, thus, a description thereof will be omitted.

Furthermore, the inorganic porous particles used at the time of adsorption of fraction which has permeated through the permeable membrane is not particularly restricted and is exemplified in active carbon, charcoal, zeolite, vermiculite, silica gel, activated alumina, titanium oxide, bentonite, acid clay, diatomaceous earth, magnesium oxide, calcium carbonate and such.

Without any pretreatment, The inorganic porous particles in their original condition can be used for adsorption removing of the impurities, however, it is more preferable to preliminarily remove mixed components such as kinds of metal, alkali and inorganic salt by using dilute acidic aqueous solution such as dilute hydrochloric acid and dilute sulfuric acid. The reason for this is that more impurities in water and water vapor can be adsorbed and removed by preliminarily removing the mixed components adsorbed to the inorganic porous particles.

Concentration of the dilute acidic aqueous solution used is not particularly restricted, however, it is preferable to be in a range of 0.1–1N. If the concentration is lower than 0.1N, the mixed components cannot be removed sufficiently, and on the other hand, if the concentration is higher than 1N, no better effects cannot be gained, thus, neither of the case is preferable.

A method for removing such mixed components is not particularly restricted, however, it is exemplified in a method wherein the inorganic porous particles are washed by using a large amount of pure water after the inorganic porous particles are soaked in dilute acidic aqueous solution for 1–24 hours and in a method wherein the inorganic porous particles are washed by running a large amount of pure water after the mixed components are removed from the inorganic porous particles which are filled in a column or the like by running down the dilute acidic Aqueous solution.

With a use of the inorganic porous particles which are prepared by the above mentioned method, the impurities such as ammonia and amines can be adsorbed and removed by a well known method, for example, a method wherein a column is filled with inorganic porous particles and then, components permeated through a permeable membrane having cationic groups are passed through the column.

In a normal circumstance, with the pervaporation method, the components passing through a permeable membrane are gaseous and they can be supplied to inorganic porous particles as them being gaseous. Additionally, they can also be supplied to inorganic porous particles once they are liquidized.

Since this method is a pervaporation method using a dense membrane which has cationic groups, permeation of the impurities such as ammonia and amines is suppressed and water is preferentially permeated, as described in the above. Thus, the concentrations of ammonia and amines on the permeation side (secondary side) lowers sharply in comparison with ammonia and amines on the feeding side (primary side). Furthermore, it becomes possible to almost completely remove even a little amount of impurities contained in water by an application of adsorption treatment of fraction on this permeation side (secondary side) with the inorganic porous particles.

Moreover, structures that have not been explained in the above are the same as the structures of each method described previously, so the description thereof will be omitted.

Next section describes the forth method of water purification.

The forth method of water purification is comprised of a pervaporation method using a composite membrane as a permeable membrane, wherein a hydrophilic membrane is layered on a surface of a hydrophobic membrane, and a method of adsorption removing using the inorganic porous particles.

This method is a method for applying an adsorption treatment to the fraction which has not permeated through a permeable membrane with the inorganic porous particles, after the same method as the second method of water purification, i.e., a treatment by the pervaporation method using a composite membrane in which a hydrophilic membrane is layered on a surface of a hydrophobic membrane, is applied to water which contains impurities such as ammonia and amines.

In other words, since this method uses the pervaporation method using the composite membrane in which a hydrophilic membrane is layered on a surface of a hydrophobic membrane, ammonia and amines permeate preferentially. This is why the concentration of ammonia and amines on the feeding side (primary side) lowers sharply in comparison with ammonia and amines on the permeation side (secondary side). Furthermore, it becomes possible to almost completely remove even a little amount of impurities contained in water by an application of adsorption treatment of the fraction on the feeding side (primary side) with the inorganic porous particles.

Moreover, a structure not being explained in the above are the same as the structures of each method described previously, so the description thereof will be omitted.

Next section describes the fifth method of water purification.

The fifth method of water purification is comprised of a pervaporation method using a dense membrane having cationic groups, a pervaporation method using a composite membrane in which a hydrophilic membrane is layered on a surface of a hydrophobic membrane and a method of adsorption removing using the inorganic porous particles.

Within this method, water which contains ammonia and amines as impurities is firstly treated by a method which is same as the first method of water purification, i.e., the first pervaporation method which uses a composite membrane as a permeable membrane wherein a hydrophilic membrane is layered on a surface of a hydrophobic membrane. Then, the fraction, which has not permeated through the permeable membrane, is treated by a method that is same as the second method of water purification, i.e., the second pervaporation method which uses a dense membrane having cationic groups as a permeable membrane. And, lastly, the fraction, which has permeated through a permeable membrane comprised of a dense membrane having cationic groups, is treated with an adsorption treatment.

In other words, firstly, this method enables the impurities such as ammonia and amines to preferentially permeate in order to treat water which contains ammonia and amines as impurities by the first pervaporation method which uses a composite membrane wherein a hydrophilic membrane is layered on a surface of a hydrophobic membrane. Thus, the concentration of impurities such as ammonia and amines on the feeding side (primary side) lowers in comparison with the concentration of impurities such as ammonia and amines on the permeation side (secondary side). Further, the fraction on this feeding side (primary side) is treated with the pervaporation method that uses a dense membrane having cationic groups as a permeable membrane. As described in the above, this second pervaporation method can suppress the permeation of the impurities such as ammonia and amines, and can make water permeate preferentially, thus, the impurities such as ammonia and amines which have not been able to be removed by the first pervaporation method can be removed. Lastly, even a little amount of impurities contained in water can also be almost completely removed by an application of adsorption treatment using the inorganic porous particles to the fraction that has permeated through the permeable membrane with the second pervaporation method.

Since this method carries out a pervaporation twice with different permeable membranes, the amount of impurities adsorbed by the inorganic porous particles can be reduced, thus, the inorganic porous particles can be used for a long period.

Moreover, structures, which have not been explained in the above are the same as the structures of each method described previously, so the description thereof will be omitted.

Each of the third, forth and fifth methods of water purification can be preferably used as a purification method for various kinds of discharged water such as domestic discharged water and of urine of human, animals and such.

Each method of water purification does not require conditions, which may be dangerous, such as application of pressure. Furthermore, a condition of reduced pressure required for a pervaporation method can be quite easily gained in the space environment. In other words, this is a method that can be suitably used in a situation such as the space environment.

Additionally, other methods excepting the three methods of water purification by the adsorption-removing method and the pervaporation method described in the above can also be used, and the example thereof is a method for separating membrane by a pervaporation method after an adsorption removing is done by the adsorption removing method with inorganic porous particles.

Furthermore, in relation to the third, forth and fifth methods of water purification, a method of continuous water purification can be offered by using a method for regenerating the inorganic porous particles. A method for continuous water purification will be described hereinafter.

The method of continuous water purification is a method wherein the inorganic porous particles are recovered by heating the inorganic porous particles with high vacuum/reduced pressure at the time of or just before an adsorption removing ability of the inorganic porous particles lowers within the process of each of the third, forth and fifth methods of water purification described in the above, so that water is continuously purified.

When adsorption amount of the inorganic porous particles lowers, it has been required to stop an operation of removing the impurities and to replace the inorganic porous particles hitherto. In comparison to this, this method uses the above described treatment method for regenerating the inorganic porous particles so that without replacing the inorganic porous particles, the impurities such as ammonia and amines contained in water can be continuously removed.

Each of the water purification methods of the third, forth and fifth is constructed so that the fraction permeated through the membrane is treated with the inorganic porous particles after a treatment of the pervaporation method is carried out. Generally, the pressure on the permeation side (secondary side) of permeation membrane is reduced in most cases, therefore, unless a special means is provided, an operation of the adsorption treatment with the inorganic porous particles is to be carried out under reduced pressure. This is to say that within each of said water purification methods of the third, forth and fifth, the inorganic porous particles are always in a condition wherein the pressure is reduced, thus, the inorganic porous particles can be recovered only with a heating treatment.

Moreover, other structures excepting this structure are the same as the structures of each method described previously, so the description thereof will be omitted.

Next, the continuous water purification device used for the above-described continuous water purification method is described with a reference made to the drawings.

Additionally, with regard to the below-described continuous water purification device, a liquid-sending tube is considered as a tube for liquid flowing, and an vapor-sending tube is considered as a tube for air flowing.

Firstly, a continuous water purification device related to the first embodiment will be described.

FIG. 1 is a schematic view illustrating the continuous water purification device (1) related to the first embodiment.

The continuous water purification device (1) illustrated in FIG. 1 comprised of a pervaporation apparatus (2), two impurity adsorption apparatus (3) and regenerating apparatus (4) installed beside each of the impurity adsorption apparatus.

As for a permeable membrane (201) of the pervaporation apparatus (2) in the continuous water purification device (1) related to the first embodiment of the present invention, it is preferable to use a permeable membrane comprised of a dense membrane having cationic groups. The reason therefor is that a dense membrane having cationic groups can suppress a permeation of ammonia and amines, as described in the above. Such dense membrane having cationic groups is exemplified in chitosan membrane, polyamine membrane, primary to quaternary alkyl ammonium polymer and such, however, it is not particularly restricted.

As for the impurity adsorption apparatus (3) in the continuous water purification device (1) related to the first embodiment of the present invention, a well known apparatus wherein adsorbent such as the inorganic porous particles are comprised therein can be used. The inorganic porous particles can be exemplified in active carbon, silica gel, active alumina, vermiculite, charcoal, zeolite and such, however, it is not particularly restricted.

Within the continuous water purification device (1) related to the present invention, at least two the impurity adsorption apparatuses (3) are necessary, and it is also possible to provide more than three of such apparatus. The reason for this is to carry out a continuous purification of water, wherein while regenerating treatment is carried out for the adsorbent of one of the adsorption apparatus, adsorption removing of the impurities by the other adsorption apparatus is carried out. Here, as in the illustrated continuous water purification device (1), two impurity adsorption apparatuses are comprised.

Each of the impurity adsorption apparatus (3) is provided with a regenerating apparatus. This regenerating apparatus has a heating means (4) and a pressure-reducing means (not being illustrated), and is an apparatus for regenerating the adsorbent under a reduced pressure by heating. Such pressure-reducing means and heating means are not particularly restricted. The pressure-reducing means can be exemplified in space environment of high vacuum for a usage in the space and in vacuum pump and the like for the usage on the earth. Also, the heating means (4) can be exemplified in infrared heating, electrical heating and such. The condition of reduced pressure is set to be a pressure below 10 Pa of numerical value. Also, the condition of heating is set to be a temperature in a rage of 100–200° C.

Additionally, within the continuous water purification device (1) of the illustrated example, a pressure-reducing means comprised in a regenerating apparatus is provided through an vapor-sending tube (52).

Within the continuous water purification device (1) related to the first embodiment of the present invention, the permeation side (secondary side) (202) of the pervaporation apparatus (2) and the feeding side (primary side) of each adsorption apparatus (3) are connected through an vapor-sending tube (53) with a direction control valve (61). The feeding side (primary side) of the pervaporation apparatus (2) is connected to a liquid-sending means (not being illustrated) through a liquid-sending tube (54).

Furthermore, an vapor-sending tube (51) with a direction control valve (62) and the vapor-sending tube (52) are provided on the permeation side (secondary side) of each adsorption apparatus (3). The vapor-sending tube (51) is connected to a purified water recovering apparatus (not being illustrated) and to a pressure-reducing apparatus (not being illustrated). The pressure-reducing apparatus in connection with the vapor-sending tube (51) is provided for reducing the pressure on the permeation side (secondary side) (202) of the pervaporation apparatus (2).

The vapor-sending tube (52) is connected to a pressure reducing apparatus (not being illustrated) comprised in the regenerating apparatus described in the above.

Such pressure-reducing apparatuses are exemplified in vacuum pump and the like for a usage on the earth, and in space of super high vacuum for a usage in space environment such as a spaceship, however, it is not particularly restricted. Also, the purified water recovering apparatus (not being illustrated) is not particularly restricted, and example thereof is a cold trap and the like that can cool water vapor to be collected as ice or water.

Additionally, it may be a structure wherein fraction which has not permeated through the permeable membrane (201) of the pervaporation apparatus (2) is in connection with a liquid-sending means (not being illustrated) through a liquid-sending tube (55) and is again supplied to the pervaporation apparatus (2) through the liquid-sending tube (54), and further, if necessary, the fraction can be supplied through a filtration filter.

Next section describes a method for continuously purifying water with the continuous water purification device (1) related to the first embodiment of the present invention.

Firstly, water is supplied to the feeding side (primary side) (203) of the pervaporation apparatus (2) through the liquid-sending tube (54). Since the permeable membrane (201) used in the pervaporation apparatus (2) preferentially passes water, the permeation side (secondary side) (202) of the pervaporation apparatus (2) is left with fraction (water vapor) wherein the amount of ammonia and amines are reduced. Then, impurities contained in this water vapor is adsorbed and removed by supplying this fraction (water vapor) to one of the impurity adsorption apparatus (the lower impurity adsorption apparatus in the illustrated example) through vapor-sending tube (53).

The water vapor of which impurities are removed while passing through the impurity adsorption apparatus (3) is supplied through the vapor-sending tube (51) to the purified water regenerating apparatus wherein purified ice or water is recovered by cooling down the water vapor.

If an adsorptivity of one of the impurity adsorption apparatus (the lower impurity adsorption apparatus in the illustrated example) lowers, the fraction which has permeated through the permeable membrane (21) of the pervaporation apparatus (2) is supplied to the other impurity adsorption apparatus (the upper impurity adsorption apparatus in the illustrated example). Furthermore, by changing over the direction control valve (62) provided on the vapor-sending tube of the permeation side (secondary side) of the impurity adsorption apparatus, other impurity adsorption apparatus is connected to the vapor-sending tube (52) and the impurity adsorption apparatus is connected to the vapor-sending tube (51).

Also, with the impurity adsorption apparatus (3), the adsorbent is regenerated by heating with a heating means (4). Then, the regenerated adsorbent will have the same original adsorptivity. Thus, water can be purified continuously by changing over such direction control valve.

Next section describes a method for continuously purifying water with a continuous water purification device related to the second embodiment of the present invention.

Figure 2:
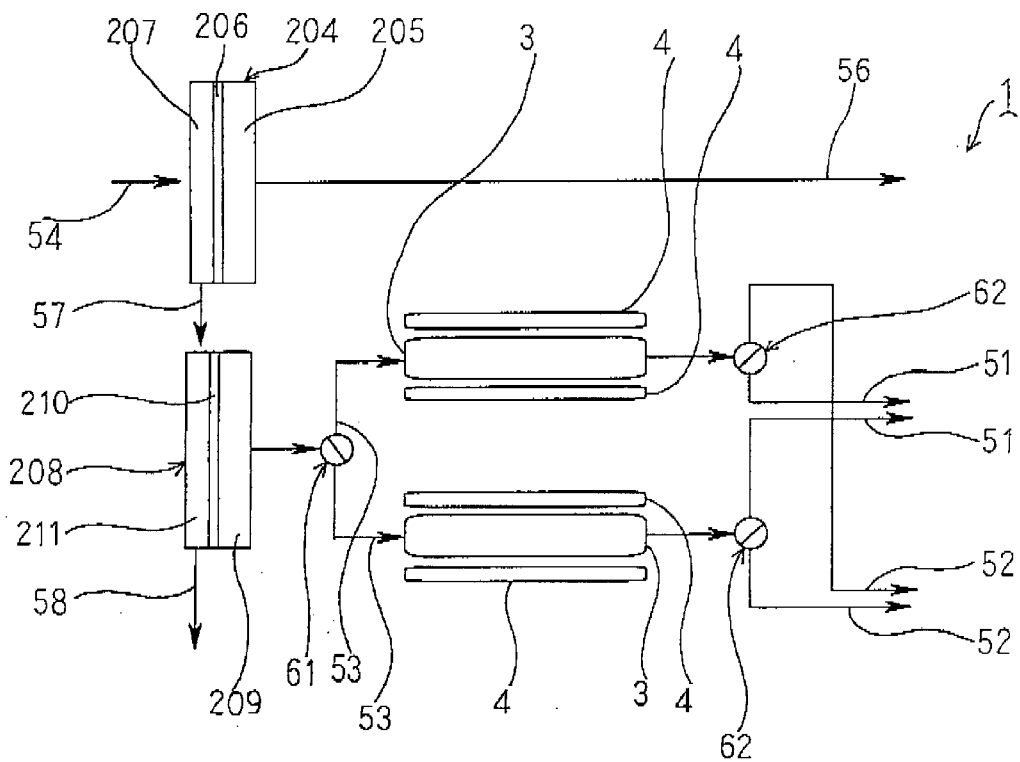
FIG. 2 is a schematic view illustrating a continuous water purification device related to the second embodiment of the present invention.

FIG. 2 is a schematic view illustrating a continuous water purification device (1) related to the second embodiment of the present invention.

The continuous water purification device (1) related to the second embodiment of the present invention is comprised of the first pervaporation apparatus (204), the second pervaporation apparatus (208) and more than two impurity adsorption apparatus (3).

As for a permeation membrane (206) of the first pervaporation apparatus (204), a composite membrane wherein hydrophilic membrane is layered on a surface of a hydrophobic porous membrane is used. Such composite membrane can suppress permeation of water and selectively permeate impurities such as ammonia and amines.

As for the hydrophobic porous membrane, it can be exemplified in polypropylene membrane, silicone membrane, Teflon membrane and such, however, it is not particularly restricted.

Also, a method for making the hydrophilic membrane layered on the surface of the hydrophobic porous membrane is not particularly restricted.

As for forming a regenerated cellulose membrane on a surface of hydrophobic porous membrane, acetone solution of cellulose acetate is coated on the surface of hydrophobic porous membrane, and after it is dried, a desired composite membrane is gained by a deacetylation with sodium hydrate solution.

Additionally, a liquid-sending means (not being illustrated) is provided through the liquid-sending tube (54) on a feeding side of the first pervaporation apparatus (204).

As for a permeation membrane (210) of the second pervaporation apparatus (208), a dense membrane having cationic groups is used. Such dense membrane can suppress permeation of the impurities such as ammonia and amines, and can preferentially permeate water.

As for the dense membrane having cationic groups, it can be exemplified in chitosan membrane, polyamine membrane, primary to quaternary alkyl ammonium polymer and such, however it is not particularly restricted.

Within the continuous water purification device related to the second embodiment, at least two of the impurity adsorption apparatus (3) are necessary, and also it is possible to provide more than three of them, as in the same manner as in the first embodiment. The reason for this is that while regenerating adsorbent of one of the impurity adsorption apparatus, the impurities are adsorbed and removed with the other impurity adsorption apparatus in order to carry out a continuous water purification. Additionally, as for the illustrated example of the continuous water purification device (1) related to the second embodiment, two of the impurity adsorption apparatus (3) are provided.

Each of the impurity adsorption apparatus (3) is provided with a regenerating apparatus. This regenerating apparatus is an apparatus comprising a heating means (4) and a pressure-reducing means (not being illustrated) for regenerating adsorbent under reduced pressure. The pressure-reducing means (not being illustrated) and the heating means (4) are not particularly restricted. The pressure-reducing means can be exemplified in vacuum pump and the like for a usage on the earth and in space environment of super high vacuum for a usage in a space environment, such as a spaceship. Also, the heating means (4) can be exemplified in infrared heating, electrical heating and such. Additionally, within the continuous water purification device (1) related to the second embodiment of the illustrated example, the pressure-reducing means (not being illustrated) which comprises the regenerating apparatus is provided through the vapor-sending tube (52).

The continuous water purification device related to the second embodiment of the present invention is constructed so that the feeding side (primary side) (207) of the first pervaporation apparatus (204) and the feeding side (primary side) (211) of the second pervaporation apparatus (208) are connected with the liquid-sending tube (57), and that the fraction which has not permeated through the permeable membrane (206) of the first pervaporation apparatus (204) is provided to the feeding side (primary side) (211) of the second pervaporation apparatus (208).

Further, a pressure-reducing means (not being illustrated) is provided on the permeation side (secondary side) (205) of the first pervaporation apparatus (204) through the vapor-sending tube (56). This pressure-reducing means is provided to reduce pressure on the permeation side (secondary side) (205) of the first pervaporation apparatus (204), and it can be exemplified in the space environment, vacuum pumps and the like, however it is not particularly restricted.

The impurity adsorption apparatus (3) is connected onto the permeation side (secondary side) (209) of the second pervaporation apparatus (208) through the vapor-sending tube (53) with a direction control valve (61).

Also, a pressure-reducing means (not being illustrated) and a purified water regenerating apparatus (not being illustrated) are provided on the permeation side (secondary side) of each impurity adsorption apparatus (3) through an vapor-sending tube (51) comprising a direction control valve (62). This pressure-reducing means (not being illustrated) is provided so as to reduce pressure on the secondary side (209) of the permeable membrane (210) of the second permeation apparatus (208), and it can be exemplified in the space environment, vacuum pumps and the like, however it is not particularly restricted. Furthermore, the purified water regenerating apparatus is not particularly restricted, and it can be exemplified in cold trap and the like which can collect water by cooling water vapor.

Next section describes a method for continuously purifying water with the continuous water purification device (1) related to the second embodiment of the present invention.

Firstly, by using a liquid-sending means (not being illustrated), water is supplied to the feeding side (primary side) (207) of the first pervaporation apparatus (204) through the liquid-sending tube (54). Since the permeable membrane (206) used in the first pervaporation apparatus (204) suppresses a permeation of water and preferentially permeates ammonia and amines, the concentration of the ammonia and amines on the feeding side (primary side) (207) of the first pervaporation apparatus (204).

Then, the fraction on the feeding side (primary side) (207) of the first pervaporation apparatus (204) is supplied to the feeding side (primary side) (208) of the second pervaporation apparatus (208) through the liquid-sending tube (57). Since the permeable membrane (210) used in the second pervaporation apparatus (208) suppresses the permeation of ammonia and amines and preferentially passes water, the permeation side (secondary side) (209) of the second pervaporation apparatus (208) is left with fraction (water vapor) wherein the amount of impurities such as ammonia and amines is reduced. The impurities contained in the water vapor is adsorbed and removed by supplying this fraction (water vapor) to one of the impurity adsorption apparatus (the lower impurity adsorption apparatus in the illustrated example) through the vapor-sending tube (53).

The water vapor wherein the impurities have been removed by going through the impurity adsorption apparatus, is fed into the purified water recovering apparatus (not being illustrated) wherein the water vapor is cooled and purified ice or water is recovered, through the liquid-sending tube (51).

Additionally, it can be constructed so that fraction which has not permeated through the permeable membrane (210) of the second permeation apparatus (208) is connected to a liquid-sending means through a liquid-sending tube (58) for being supplied again to the first pervaporation apparatus (204).

If the adsorptivity of one of the impurity adsorption apparatus (the lower impurity adsorption apparatus in the illustrated example) lowers, not only the adsorbent of one of the impurity adsorption apparatus can be regenerated but also the impurities can be adsorbed and removed in the other impurity adsorption apparatus by the same method, as has been described for said first embodiment.

The continuous water purifying device related to the second embodiment of the present invention is provided with two different pervaporation apparatuses which can remove a good amount of impurities, thus, it is possible to maintain the adsorptivity of the adsorbent for a long period.

Within the above described continuous water purifying devices related to the present invention, impurity adsorptive apparatuses are provided on the permeation side (secondary side) of the permeable membranes. In a normal circumstance, the pressure on the permeation side (secondary side) of the permeable membrane is usually being reduced, thus, the impurity adsorption apparatuses provided on the permeation side (secondary side) of the permeable membrane carry out adsorption treatments under a reduced pressure. In other words, if the adsorbent is to be regenerated, the regenerating-treatment thereof can be carried out only with heating.

DETAILED DESCRIPTION OF PREFERRED EMBODIMENTS

Following is described the present invention with embodiments, however, the present invention is intended no restriction by these embodiments.

Embodiment 1: Absorption Removing of Ammonia in Water

The deodorant (Product name: Nonsmell, Manufacturer: Kabushikikaisha Hakugen) which adsorptivity was decreased, was regeneration-treated, in consequence of putting into a desorption container, reducing pressure therein to 10 Pa with a vacuum pump, then under such condition, heating to approximately 170 to 180° C. with an electric heater or an infrared heater.

Next, 0.086% ammonia water was flowed with current speed of 5 ml/min. to a column (30 mm$\phi$×300 mm) that is filled up 60 g of the regeneration-treated deodorant for refrigerators, and the ammonia concentration of the discharge liquid of the fixed volume was measured.

Furthermore, the ammonia concentration was measured on the following condition by using an ion chromatography. Each of following embodiments was measured on the same condition.

Analysis column: Shinmpack IC-C-3(4.60 mm$\phi$×10 cm), Mobile phase: 1.0/min., Temperature: 40° C., Detection: Electric conductivity detector (TOYOSODA CO-8000).

Embodiment 2: Absorption Removing of Ammonia in Water 50 g of deodorant for refrigerators (Product name: Nonsmell, Manufacturer: Kabushikikaisha Hakugen), which was regeneration-treated twice, was put into a column (30 mm$\phi$×300 mm), 0.07% ammonia water was flowed with current speed of 5 ml/min, then the ammonia concentration of the discharge liquid of the fixed volume was measured.

Embodiment 3: Absorption Removing of Ammonia in Water

The charcoal (Product name: MC-450, Manufacturer: Date Shinrinkumiai) which adsorptivity was decreased, was regeneration-treated with heating at approximately 170° C. for 5 hours under a condition wherein pressure was decreased to 10 Pa. 36 g of said charcoal was put into a column (30 mm$\phi$×300 mm), 0.1% ammonia water was flowed with current speed of 5 ml/min, then the ammonia concentration of the discharge liquid of the fixed volume was measured.

Embodiment 4: Absorption Removing of Ammonia in Water

The deodorant for refrigerators (Product name: Nonsmell, Manufacturer: Kabushikikaisha Hakugen), which adsorptivity was decreased, was regeneration-treated with the same method as embodiment 1.60 g of said deodorant for refrigerators which was regeneration-treated, was put into a column (30 mm$\phi$×300 mm), 0.1% ammonia water was flowed with current speed of 5 ml/min, then the ammonia concentration of the discharge liquid of the fixed volume was measured.

Embodiment 5: Absorption Removing of Ammonia in Water

The silica gel (silica gel white, 5 to 10 mesh, Manufacturer: Junsei Kagaku Kabushikikaisha), which adsorptivity was decreased, was regeneration-treated, in consequence of putting into a desorption container, reducing pressure therein to 10 Pa with a vacuum pump, then under such condition, heating to approximately 170 to 180° C. with an electric heater or an infrared heater.

100 g of said silica gel was put into a column (30 mm$\phi$×300 mm), 0.097% ammonia water was flowed with current speed of 5 ml/min., then the ammonia concentration of the discharge liquid of the fixed volume was measured.

Embodiment 6: Absorption Removing of Ammonia in Water

Metal ion and the like in the adsorbent was removed in consequence of that 200 g of silica gel (silica gel white, 5 to 10 mesh, Manufacturer: Junsei Kagaku Kabushikikaisha) was dipping-treated into 1N hydrochloric acid for 24 hours at room temperature, then was washed with 500 ml of pure water for 5 to 10 times repeatedly. The silica gel which adsorptivity was decreased was regeneration-treated with the same method as said embodiment 5 by using said wash-treated silica gel. The same test as said embodiment 5 was carried out with the 100 g silica gel.

Embodiment 7: Absorption Removing of Ammonia in Water

The silica gel which was used in embodiment 6 with the decreased adsorptivity was regeneration-treated with the same method as said embodiment 5, then the same test as said embodiment 5 was carried out with using 100 g silica gel.

Embodiment 8: Absorption Removing of Ammonia in Water

The silica gel which was used in embodiment 7 with the decreased adsorptivity was regeneration-treated with the same method as said embodiment 5, then the same test as said embodiment 5, then the same test as said embodiment 5 was carried out with using 100 g silica gel.

Table 1 shows the result of embodiments 1 to 8.

TABLE 1

| Embodiment | Adsorbent | Concentration of discharge liquid (%) | Discharge liquid amount (ml) | Equilibrium adsorption amount (mg/g) |
| --- | --- | --- | --- | --- |
| 1 | Deodorant for refrigerators | 0.03 0.07 | 300 | 1.1 |
| 2 | Deodorant for refrigerators | 0.01 0.05 | 300 | 2.18 |
| 3 | Charcoal | 0.01 0.09 | 300 | 3.45 |
| 4 | Deodorant for refrigerators | 0.00 0.07 | 300 | 2.41 |
| 5 | Silica gel | Not detected | 600 | — |
| 6 | Silica gel | Not detected | 600 | — |
| 7 | Silica gel | Not detected | 600 | — |
| 8 | Silica gel | Not detected | 3100 | 27 |

As the result of Table 1, it can be seen that the regeneration treatment method which uses both heating and reducing pressure of the inorganic porous particles with decreased adsorptivity can recover the adsorptivity of inorganic porous particles.

Embodiments 9 to 13

10 parts by weight of Chitosan (CTA020213, manufactured by Katakura Chikkarin) which deacetylation degree is 98% was dissolved into the mixed solution of 980 parts by weight of water and 10 parts by weight of acetic acid, then 1% chitosan solution was prepared. 140 g of this 1% chitosan solution was cast to an acrylic resin plate (20 cm×20 cm×1 cm thickness). Solvent was drying-removed by standing horizontally, then chitosan acetate membrane was formed on the acrylic resin plate. In consequence of dipping said chitosan acetate membrane into 1% sodium hydroxide, after the chitosan membrane was regenerated and sodium hydroxide was removed by using a lot of pure water, dried chitosan membrane of the thickness 30 μm was obtained by sticking and drying on the acrylic plate.

This chitosan membrane was set to a pervaporation permeation cell, and approximately 0.1% ammonia solution (cf. the following Table for observation numerical values) was sent to the feeding side with a roller pump. The permeation side was connected to a vacuum line, reducing pressure of $1\times10$ to $1\times10^2$ Pa, then the pervaporation was carried out under the permeation temperature shown in the following Table 2. The permeated component was condensed in a trap cooled with liquid nitrogen and scavenged. The scavenged permeated component was analyzed with a high-speed liquid chromatography, and ammonia was determined. The used column for high-speed liquid chromatography was Shimpack IC-C3, and ammonia detection was carried out with an electric conductivity detector.

TABLE 2

| Embodiment | Temperature (° C.) | Permeation (kg/m² · day) | Ammonia Concentration % (Feeding side) | Ammonia Concentration % (Permeation side) | Removing rate ammonia (%) |
|---|---|---|---|---|---|
| 9  | 29.7 | 169.37 | 0.0989 | 0.0405 | 59.05 |
| 10 | 35.0 | 194.91 | 0.1025 | 0.0442 | 56.88 |
| 11 | 41.4 | 237.16 | 0.0995 | 0.0432 | 56.58 |
| 12 | 45.9 | 258.97 | 0.0999 | 0.0423 | 57.66 |
| 13 | 50.9 | 283.58 | 0.0965 | 0.0403 | 58.24 |

As the result of Table 2, it was the pervaporation method wherein a dense membrane having cationic groups is used as a permeable membrane, therefore it is possible to remove ammonia dissolved in water.

Embodiments 14 to 20

The chitosan membrane used in Embodiment 9 was set to a pervaporation permneation cell, and approximately 0.1% (cf. the following Table for observation numerical values) ammonia solution was sent to the feeding side with a roller pump. A column (12 mmφ×100 mm) wherein the permeation side was filled with 10 g of silica gel, were connected to the permeation side, the outlet thereof was connected to the trap cooled with liquid nitrogen and the vacuum line wherein the vacuum pump was attached, and the pervaporation was carried out under a condition wherein the pressure is reduced to $1\times10$ to $1\times10^2$ Pa and the permeation temperature in the range of 30 to 50° C. The permeated component was condensed in a trap cooled with liquid nitrogen and scavenged. Ammonia of the scavenged permeated component was determined.

Table 3 shows the result of embodiments 14 to 20.

TABLE 3

| Embodiment | Temperature (° C.) | Permeation (kg/m² · day) | Ammonia concentration (Feeding side) | Ammonia concentration % (Permeation side) | Removing rate of ammonia (%) |
|---|---|---|---|---|---|
| 14 | 34.6 | 36.24  | 0.131  | 0.00015  | 99.89 |
| 15 | 39.7 | 116.26 | 0.1014 | 0.00002  | 99.98 |
| 16 | 44.6 | 156.68 | 0.0086 | 0.00007  | 99.19 |
| 17 | 51.2 | 195.25 | 0.1044 | 0.000244 | 99.17 |
| 18 | 57.1 | 211.1  | 0.1306 | 0.00011  | 99.92 |
| 19 | 64.1 | 225.99 | 0.1254 | 0.00048  | 99.62 |
| 20 | 64.2 | 265.77 | 0.1332 | 0.00145  | 98.91 |

As the result of Table 3, it is possible to almost completely remove ammonia dissolved in water because the present invention includes the pervaporation method wherein a dense membrane having cationic groups is used as a permeable membrane and the water purification method wherein the method for adsorption removing using the inorganic porous particles is used.

Embodiments 21 to 31

The chitosan membrane used in Embodiment 9 was set to the pervaporation permeation cell, and approximately 0.1% (cf. the following Tables for observation numerical values) ammonia solution was sent to the feeding side with a roller pump. Two columns ( 12 mmφ×100 mm) wherein the permeation side was filled with 10 g of silica gel, were connected as series (Embodiments 21 to 26) or parallel (Embodiments 27 to 31), the outlet thereof was connected to the trap cooled with liquid nitrogen and the vacuum line wherein the vacuum pump was attached, and the pervaporation was carried out under a condition wherein the pressure is reduced to $1\times10$ to $1\times10^2$ Pa and the permeation temperature in the range of 30 to 50° C. The permeated component was condensed in a trap cooled with liquid nitrogen and scavenged. Ammonia of the scavenged permeated component was determined.

Embodiments 32

The chitosan membrane used in Embodiment 9 was set to the pervaporation permeation cell, and approximately 0.1% ammonia solution (cf. the following Table for observation numerical values) was sent to the feeding side with a roller pump. Two columns (12 mmφ×100 mm) wherein the permeation side was filled with 10 g of round shaped active carbon (Product name: X7100, Lot No. DXW01), were connected as parallel, the outlet thereof was connected to the trap cooled with liquid nitrogen and the vacuum line wherein the vacuum pump was attached, and the pervaporation was carried out under a condition wherein the pressure is reduced to $1\times10$ to $1\times10^2$ Pa and the permeation temperature 50° C.

The permeated component was condensed in a trap cooled with liquid nitrogen and scavenged. Ammonia of the scavenged permeated component was determined.
Table 4 shows the result of embodiments 21 to 26, and Table 5 shows the result of embodiments 27 to 32.

roller pump. The feeding side was connected to the vacuum line, and pressure was reduced to $1\times10$ to $1\times10^2$ Pa, then the pervaporation was carried out at the temperature shown in following Table 6. The permeated component was condensed in a trap cooled with liquid nitrogen and scavenged. Ethylenediamine of the scavenged permeated component was determined.

Embodiments 34 to 35

The chitosan membrane used in Embodiment 9 was set to a pervaporation permeation cell, and a column (12 mmφ×100 mm) wherein silica gel (Embodiment 34) or round shaped active carbon (Product name: X7100, Lot No. DXW01) (Embodiment 35) was filled, was connected to the feeding side, and the outlet thereof was connected to the trap cooled with liquid nitrogen and the vacuum line wherein the

TABLE 4

| Embodiment | Column | Temperature (° C.) | Permeation | Ammonia concentration % (Feeding side) | Ammonia concentration % (Permeation side) | Removing rate of ammonia (%) |
|---|---|---|---|---|---|---|
| 21 | Series | 43.9 | 135.71 | 0.1473 | 0.000067 | 99.95 |
| 22 | Series | 50.2 | 109.53 | 0.1489 | 0.000697 | 99.53 |
| 23 | Series | 55.0 | 118.82 | 0.1483 | 0.000038 | 99.97 |
| 24 | Series | 60.1 | 112.02 | 0.1506 | 0.000036 | 99.96 |
| 25 | Series | 63.8 | 89.42 | 0.1459 | 0.000052 | 99.96 |
| 26 | Series | 68.6 | 150.65 | 0.1479 | 0.00020 | 99.86 |

TABLE 5

| Embodiment | Column | Temperature (° C.) | Permeation (kg/m² · day) | Ammonia concentration (Feeding side) | Ammonia concentration % (Permeation side) | Removing rate of ammonia (%) |
|---|---|---|---|---|---|---|
| 27 | Parallel | 43.9 | 118.75 | 0.1379 | 0.000021 | 99.99 |
| 28 | Parallel | 49.0 | 165.05 | 0.1403 | 0.000038 | 99.97 |
| 29 | Parallel | 57.1 | 189.98 | 0.13227 | 0.0000097 | 99.99 |
| 30 | Parallel | 60.6 | 204.55 | 0.1332 | 0.000068 | 99.95 |
| 31 | Parallel | 65.7 | 193.80 | 0.1311 | 0.000043 | 99.97 |
| 32 | Parallel | 71.4 | 222.05 | 0.1279 | 0.00022 | 99.83 |

As the result of Tables 4 and 5, it is possible to almost completely remove ammonia dissolved in water because the present invention includes the pervaporation method wherein a dense membrane having cationic groups is used as a permeable membrane and the water purification method wherein the method for adsorption removing using the inorganic porous particles is used.

Embodiments 33

The chitosan membrane used in Embodiment 9 was set to a pervaporation permeation cell, and approximately 0.1% ethylenediamine solution (cf. the following Table for observation numerical values) was sent to the feeding side with a vacuum pump was attached. Approximately 0.1% ethylenediamine solution (cf. the following Table for observation numerical values) was sent to the feeding side with a roller pump, and the pervaporation was carried out under a condition wherein the pressure is reduced to $1\times10$ to $1\times10^2$ Pa and the permeation temperature in the range of 30 to 50° C. The permeated component was condensed in a trap cooled with liquid nitrogen and scavenged. Ethylenediamine of the scavenged permeated component was determined.

Table 6 shows the result of embodiments 33 to 35.

TABLE 6

| Embodiment | Temperature (° C.) | Permeation (kg/m² · day) | Ethylenediamine concentration (%) (Feeding side) | Ethylenediamine concentration (%) (Permeation side) | Removing rate of ethylenediamine (%) |
|---|---|---|---|---|---|
| 33 | 52.7 | 196.86 | 0.06800 | 0.00323 | 89.36 |
| 34 | 52.7 | 123.56 | 0.06842 | 0.00000734 | 99.99 |
| 35 | 52.6 | 108.03 | 0.06870 | 0.000201 | 99.71 |

As the result of Table 6, it is possible to remove amines such as ethylenediamine dissolved in water because the present invention includes the pervaporation wherein a dense membrane having cationic groups is used as a permeable membrane.

Embodiments 36 to 38

After 10% cellulose acetate/acetone solution was coated, air dried, then the hollow fiber composite membrane was obtained in consequence of deacetylating with 1N sodium hydroxide and forming the regenerated cellulose membrane to the outside surface of the hollow porous membrane (EX540VS-12, made by Mitsubishi Rayon). This hollow fiber composite membrane was fixed to the module made of acrylic resin.

This hollow fiber composite membrane was set to a pervaporation permeation cell, and the solution containing ammonia was fed. As for sending the feeding liquid, a tube pump was used and the speed of 188 ml (40° C.) to 194 ml (60° C.) per minutes. The feeding liquid and the heat exchanger were dipped into the same constant temperature bath, the temperature of the feeding liquid to the module at the inlet and the outlet was monitored. Both inside edges of the hollow fiber composite membrane was connected to the vacuum line, and the permeated component was scavenged with the test tube trap cooled with liquid nitrogen. The pressure during the permeation experiment was measured with a Pirani gauge, and was 30 to 40 Pa.

The ammonia concentration of fraction that had permeated and of fraction had not permeated through the permeation membrane were measured.

Furthermore, as comparative embodiment, the same experiment as the above was carried out with a hollow module (Product name: Clearance E Hollow fiber typed Dializer, Manufactured by Telumo Kabushikikaisha) on the market.

Table 7 shows the result of embodiments 36 to 38.

TABLE 7

| Embodiment | Temperature (° C.) | Permeation rate (kg/m$^2$ · day) | Ammonia concentration (%) (Feeding Side) | Ammonia concentration (%) (Permeation Side) |
| --- | --- | --- | --- | --- |
| 36 | 44.6 | 143 | 0.1 | 0.40 |
| 37 | 59.2 | 274 | 0.1 | 0.33 |
| 38 | 63.9 | 343 | 0.1 | 0.30 |
| comparative | 50 | 74.3 | 0.1 | 0.1 |

As the result of Table 7, it is possible to suppress permeation of water and further cause ammonia to permeate preferentially because the present invention includes the pervaporation method wherein the permeative membrane in which the hydrophilic membrane is layered on the surface of the hydrophobic membrane.

Further, a hollow module on the market could not separate water and ammonia.

As described in the above, the present invention can regenerate all kinds of inorganic porous particles by only physical method as heating and reducing pressure without using chemicals such as solvent.

Therefore, it will be possible to be used preferably even under the special condition such as a space station which size is limited and space environment. In addition, the inorganic porous particles, which are regeneration-treated, can recover original ability of adsorption removing.

The present invention can permeate ammonia and amines preferentially, therefore it is possible to purify the water wherein ammonia and amines as impurities are dissolved, by the pervaporation method, though it has been hitherto thought impossible. This pervaporation method does not require risky conditions such as increasing pressure, but the condition of reducing pressure required for pervaporation can be obtained easily. In addition, since the apparatus can be made small, it is possible to apply regeneration-treatment of water under the condition like space environment.

The present invention suppress permeation of water and permeates ammonia and amines preferentially, therefore it is possible to purify the water wherein ammonia and amines as impurities are dissolved, by the pervaporation method, though it has been hitherto thought impossible. This pervaporation method does not require risky conditions such as increasing pressure but the condition of reducing pressure required for pervaporation can be obtained easily. In addition, since the apparatus can be made small, it is possible to apply regeneration-treatment of water under the condition like space environment.

As to the purification method having the pervaporation method and inorganic porous particles, it is possible to remove impurities dissolved in water with very high removing rate of ammonia. Furthermore, this method does not require risky conditions such as increasing pressure, but the condition of reducing pressure required for pervaporation can be obtained easily. In addition, since the apparatus can be made small, it is possible to apply regeneration-treatment of water under the condition like space environment.

The present invention, because the pervaporation method having two different permeative membranes are used, can reduce impurities which are flowed into inorganic porous particles, and will be able to use inorganic porous particles for long-term without regenerating.

The present invention regenerates inorganic porous particles which adsorptivity is lowered, so that it will be able to treat water continuously. Also, in a general case, the inorganic porous particles are always under a condition of reduced pressure, therefore it is possible to regenerate inorganic porous particles by only heating.

The present invention can provide the apparatus that can continuously carry out a water purification-treatment. Also, the apparatus does not use chemical measures such as solvent for regeneration-treatment of inorganic porous particles, therefore it can be preferably used in restricted environments such as the space environment.

What is claimed is:

1. A method for regenerating inorganic porous particles adsorbing at least ammonia and/or amines, wherein the inorganic porous particles are heated to 100–200° C. under a reduced pressure of 10 Pa or less to remove adsorbed products such as ammonia and/or amines.

2. A method for purifying water containing at least ammonia as impurities by pervaporation method, wherein a dense membrane having cationic groups is used as a permeable membrane so as to suppress permeation of the impurities such as ammonia, and further the impurities that have permeated through said permeable membrane are adsxrbed and removed by use of inorganic porous particles, and the inorganic porous particles adsorbing the impurities such as ammonia is heated to 100–200 under a reduced pressure of 10 Pa or less, to remove the adsorbed products such as ammonia.

3. A method for purifying water containing at least ammonia as impurities by pervaporation method, wherein a dense membrane having cationic groups is used as a permeable membrane, the liquid water containing ammonia as impurities on the feeding side of the said permeation membrane is supplied, the permeation of the impurities such as ammonia from the side of said membrane is suppressed, and the water is preferentially permeated from the feeding side to the permeation side of the said membrane under condition of the pressure of the said permeation side of the said membrane at the level of less than the vapor pressure of the component which permeates the said membrane.

4. A method for purifying water containing at least ammonia as impurities by pervaporation method, wherein a dense membrane having cationic groups is used as a permeable membrane, the liquid water containing ammonia as impurities on the feeding side of the said membrane is supplied, the permeation of the impurities such as ammonia from the feeding side to permeation side of said permeation membrane is suppressed, and the water is preferentially permeated from the feeding side to the permeation side of the said permeation membrane under the condition of the pressure of the said permeation side of the said membrane at the level of less than the vapor pressure of the component which permeates the said membrane; and a fraction which permeated said membrane is supplied to the inorganic porous particles, and the impurity such as ammonia is adsorbed and removed by the inorganic porous particles.

5. A method for purifying water containing at least ammonia as impurities by pervaporation method, wherein a dense membrane having ationic groups is used as a permeable membrane, the liquid water containing ammonia as impurities on the feeding side of the said permeation membrane is supplied, the permeation of the impurities such as ammonia from the feeding side to permeation side of said permeation membrane is suppressed, and the water is preferentially permeated from the feeding side to the permeation side of the said permeation membrane under the condition of the pressure of the said permeation side of the said permeation membrane at the level of less than the vapor pressure of the component which permeates the said permeation membrane; and the fraction which permeated said permeation membrane is supplied to the inorganic porous particles, and the impurity such as ammonia is adsorbed and removed by use of the inorganic porous particles; and the inorganic porous particles adsorbing the impurities such as ammonia are heated to 100–200° C. under a reduced pressure of 10 Pa or less, to remove the adsorbed products such as ammonia.

6. An apparatus for continuous purification of water containing at least ammonia as an impurity, which comprises a pervaporation apparatus and two or more impurity-adsorbing apparatuses wherein the said pervaporation apparatus has
a liquid sending means connected to the feeding side so as to
supply the water containing ammonia as impurities, and
a permeable membrane comprising a dense membrane having cationic groups, wherein the impurity-adsorbing apparatus has
a regenerating apparatus comprising a heating means and in which a pressure-reducing means is equipped; a permeation side of the pervaporation apparatus is connected to the feeding side of the impurity-adsorbing apparatuses through vapor-sending tubes in which directional controlling valves are equipped a pressure-reducing means for reducing pressure of the permeation side through vapor-sending tubes of said pervaporation apparatus and purifying water collecting means are equipped in permeation side each impurity-adsorbing apparatus and the fraction which permeates a permeable membrane of the pervaporation apparatus is the fraction of vapor, decreasing amount of ammonia and amines from the liquid containing ammonia as an impurity, which is supplied to the feeding side of said pervaporation apparatus.

* * * * *